United States Patent [19]

Magyar et al.

[11] Patent Number: 5,204,083
[45] Date of Patent: Apr. 20, 1993

[54] PROCESS FOR PREPARING TITANIUM DIOXIDE

[75] Inventors: John C. Magyar, Ackerman; R. Gerald McDill, Amory; Eugene R. Adams, Caledonia, all of Miss.

[73] Assignee: Kerr-McGee Chemical Corporation, Oklahoma City, Okla.

[21] Appl. No.: 197,212

[22] Filed: May 23, 1988

[51] Int. Cl.$^5$ .............................................. C01G 23/04
[52] U.S. Cl. ...................................... 423/613; 106/437
[58] Field of Search ......................... 423/613; 106/437

[56] References Cited

U.S. PATENT DOCUMENTS

| | | | |
|---|---|---|---|
| 3,208,866 | 9/1965 | Lewis | 423/612 |
| 3,214,284 | 10/1965 | Wilson | 106/300 |
| 3,228,887 | 1/1966 | Evans et al. | 106/437 |
| 3,304,265 | 2/1967 | Evans et al. | 106/437 |
| 3,329,483 | 4/1967 | Evans et al. | 106/437 |
| 3,356,456 | 12/1967 | Wilson | 106/437 |
| 3,485,583 | 12/1969 | Wilson | 106/437 |
| 3,512,219 | 5/1970 | Stern et al. | 23/277 |
| 3,639,100 | 2/1972 | Rick | 423/613 |
| 3,640,745 | 2/1972 | Darr et al. | 423/613 |
| 4,803,056 | 2/1989 | Morris | 423/613 |

FOREIGN PATENT DOCUMENTS 2037266  7/1980  United Kingdom ................ 423/613

Primary Examiner—Michael Lewis
Assistant Examiner—Steven Bos
Attorney, Agent, or Firm—Herbert M. Hanegan

[57] ABSTRACT

An improved method for preparing a rutile titanium dioxide pigment of uniform particle size wherein the pigment is formed by reaction of a mixture of an oxidizing gas and a titanium halide in the vapor phase at elevated temperatures in the presence of a metal ion containing compound. The improvement comprises introducing the metal ion containing compound into a vapor phase oxidation reactor containing the reacting mixture in at least two separate and discrete increments. The first increment is introduced into the reactor at a point prior to reaction of said mixture having occurred while the second increment is introduced into the reactor at a point wherein at least 20 weight percent of the total titanium halide reactant has been converted to the desired titanium dioxide pigment.

7 Claims, No Drawings

PROCESS FOR PREPARING TITANIUM DIOXIDE

FIELD OF THE INVENTION

The present invention relates to the preparation of rutile titanium dioxide pigment. Particularly, the present invention relates to an improvement in a process for the preparation of rutile titanium dioxide pigment by oxidation of a titanium halide in the vapor phase in the presence of a metal ion containing compound. More particularly, the improvement of this invention relates to the addition of the metal ion containing compound in separate and discrete increments for both controlling pigment particle sizes and facilitating the separation and recovery of the pigment from the process gases.

BACKGROUND OF THE INVENTION

In U.S. Pat. No. 3,208,866 there is described an improved process for the preparation of high quality titanium dioxide pigments. The described process comprises oxidizing a titanium halide such as titanium tetrachloride, in a vapor phase oxidation reactor, with a high oxygen content oxidizing gas at elevated temperatures and in the presence of small regulated amounts of metal ions such as potassium ion. The metal ions can be charged to the vapor phase oxidation reactor either in their elemental state as a vapor, liquid or solid or in the form of various soluble or insoluble inorganic or organic compounds thereof. Whatever the particular form in which the metal ions are employed, preferably they are introduced into the vapor phase oxidation reactor by adding them to or incorporating them into the oxidizing gas stream being charged to the reactor. However, if desired, it also is disclosed that the metal ions can be charged directly into the reactor and to the mixed or mixing titanium halide and oxidizing gas reactants therein ahead of the actual flame of the reaction.

The use of such metal ions is disclosed as providing in-process titanium dioxide pigment products characterized by improved, more uniform particle sizes and more uniform high bulk densities. According to this patent, this latter property is of particular significance, since during the subsequent dry milling of the pigment product such milling is more readily and efficiently carried out. While these characteristics are disclosed as being highly desirable, one serious disadvantage associated with the use of these metal ions involves the separation of the titanium dioxide pigment product from the gaseous stream issuing from the reactor and in which stream the pigment product is suspended. For reasons not fully understood, the use of these metal ions leads to difficulties in effecting an efficient and economical separation of the suspended titanium dioxide pigment product from the gaseous stream in which they are suspended. Specifically, these difficulties have included a diminished capability to effect the desired separation, rapid and frequent blockage of filtration means used in conjunction with this separation and, as a result, a reduction in overall production capacity. Thus, the providing of means permitting the use of such metal ions while overcoming the above mentioned difficulties associated with such use would represent a significant advancement over the current state of the art in this field.

SUMMARY OF THE INVENTION

Broadly, the present invention relates to the preparation of rutile titanium dioxide pigment. More particularly, the present invention relates to an improvement in a method for the preparation of rutile titanium dioxide pigment wherein said method comprises reacting, in a reaction zone of a vapor phase oxidation reactor, a mixture of a titanium halide and an oxidizing gas in the vapor phase at elevated temperatures and in the presence of at least one metal ion containing compound capable of providing pigment particles of consistent and uniform size.

The improvement comprising the present invention and applicable to the above method comprises introducing the metal ion containing compound into the reaction mixture of the titanium halide and oxidizing gas contained in the reaction zone of the oxidation reactor in separate and discrete increments. The number of increments employed will comprise a first increment and at least one additional increment. The first increment is introduced into the reaction zone of the oxidation reactor prior to or contemporaneous with the titanium halide and the oxidizing gas. The at least one additional increment is introduced into the reaction zone of the oxidation reactor at a point subsequent to the point of addition of the first increment to said reaction zone and subsequent to at least partial reaction of the mixture of the titanium halide and oxidizing gas having occurred.

DETAILED DESCRIPTION OF THE INVENTION

It now has been discovered that through the use of the improvement of this invention it not only is possible to produce a rutile titanium dioxide pigment of controlled particle size utilizing the hereafter defined metal ion containing compounds but also it is now possible to avoid the subsequent processing problems heretofore associated with the use of these metal ion containing compounds, i.e., the tendency of the pigments so produced to not readily separate from the byproduct gases and to plug the filtration means employed in conjunction with this separation.

The methods to which the improvement of the present invention is applicable include any of the known vapor phase oxidation methods employed to produce rutile titanium dioxide pigment. Illustrative, but nonlimiting, examples of such vapor phase oxidation processes are those processes disclosed in U.S. Pat. Nos. 3,208,866 and 3,512,219 and the process disclosed in U.S. application Ser. No. 761,329 filed Jul.31, 1985 now U.S. Pat. No. 4,803,056 issued Feb. 7, 1989, the teachings of which are incorporated herein by reference in their entirety.

In general, the processes disclosed in the above identified patents and patent application comprise individually preheating the titanium halide and oxidizing gas reactants to temperatures of at least about 800° C. and preferably to temperatures within the range of about 900° C. to about 1000° C. prior to their introduction into the oxidation reactor apparatus. Such preheating can be accomplished by use of various known indirect or direct heating means such as described in U.S. Pat. No. 3,512,219 and U.S. patent application Ser. No. 761,329 filed Jul. 31, 1985 now U.S. Pat. No. 4,803,056 issued Feb. 7, 1989. Typical preheating means disclosed therein include, for example, shell and tube type heat exchangers, silica pipe heat exchangers and the like. In addition, the oxidizing gas reactant can be preheated by incorporating therein a hot gaseous combustion product obtained by burning a combustible material such as acetylene, carbon monoxide, methane, propane, and the like.

When only a portion of the total amount of the titanium halide reactant required for the reaction is added contemporaneous with the oxidizing gas reactant in accordance with the disclosure in U.S. application Ser. No. 761,329 now U.S. Pat. No. 4,803,056 then only this portion needs to be heated to the temperatures described above. The remaining balance of this reactant, which is introduced to the oxidation reactor at a point downstream of the introduction and onset of reaction of the initially added portion of this reactant and the oxidizing gas, can be heated to a temperature as low as about 165° C. and introduced into the oxidation reactor at this lower temperature. Preferably, the remaining balance of the titanium halide reactant will be heated to temperatures in the range of from about 165° C. to about 182° C.

The titanium halide reactant useful in the above known vapor phase oxidation processes and to which the present invention is applicable can comprise any of the known halides of titanium. Thus, the titanium halide reactant can comprise titanium tetrachloride, titanium tetrabromide, titanium tetraiodide and titanium tetrafluoride. Preferably, however, titanium tetrachloride is the titanium halide of choice and most, if not all, vapor phase oxidation processes for producing rutile titanium dioxide pigment are based on the use of this halide of titanium.

Also, the oxidizing gas reactant employed in such known processes preferably will comprise molecular oxygen. However, it can consist of oxygen in admixture with air or oxygen enriched air. The choice of the particular oxidizing gas employed will depend on a number of factors including the size of the reaction zone within the oxidation reactor, the degree to which the titanium halide and oxidizing gas reactants are preheated, the extent to which the surface of the reaction zone is cooled and the throughput rate of the reactants in the reaction zone. For example, according to U.S. Pat. No. 3,512,219 the amount or proportion of oxygen in the oxidizing gas is one of the factors that determines the maximum temperature reached by the reacting gaseous mixture of the titanium halide and oxidizing gas within the reaction zone. It also is a factor in determining the temperature distribution along the length of the reaction zone or zones and the particle size of the titanium dioxide pigment product.

While the exact amounts of the titanium halide and oxidizing gas reactants employed can vary widely and are not particularly critical, it is important that the oxidizing gas reactant be present in an amount sufficient to provide for stoichiometric reaction with the titanium halide. Generally, the amount of the oxidizing gas reactant employed will be an amount in excess of that required for stoichiometric reaction with the titanium halide reactant, which excess can range from about 5 percent to about 25 percent over that required for stoichiometric reaction.

In addition to the titanium halide and oxidizing gas reactants introduced into the oxidation reactor, it is frequently desirable to introduce other conditioners and agents into the reaction zone of the oxidation reactor for purposes of control of particle size and rutile formation. Thus, it is known to introduce water vapor into the reaction zone of the oxidation reactor for controlling the nucleation and therefore the particle size of the titanium dioxide pigment being produced. Although this water vapor can be introduced into the reaction zone of the oxidation reactor by various means, preferably it is introduced into said reaction zone in mixture with the preheated oxidizing gas. In general, the water vapor is introduced into the reaction zone in amounts ranging from about 50 to about 25,000 parts per million (based on the weight of the titanium dioxide pigment being produced, preferably about 50 to about 5,000 parts per million.

It also is known to add other materials which, upon oxidation, enhance the formation of rutile phase titanium dioxide pigment. For example, aluminum chloride is one material which is employed to aid in the formation of rutile titanium dioxide pigment. The aluminum chloride and other oxidizable materials equivalent thereto can be introduced into the reaction zone directly or in admixture with the titanium halide reactant. When introduced in admixture with the titanium halide reactant these materials can be admixed with the titanium halide as a vapor during preheating of the latter or these materials and the titanium halide can be premixed in liquid form and then vaporized jointly.

The amount of a material, such as aluminum chloride, employed as a rutilization agent, generally will be an amount that, upon oxidation, will provide from about 0.1 to about 10 weight percent of the corresponding oxide based upon the weight of the rutile titanium dioxide pigment being produced. Preferably, the amount of the rutilization agent will be an amount sufficient to provide from about 0.3 to about 4.0 weight percent of the corresponding oxide based upon the weight of the titanium dioxide pigment being produced.

In addition to water, U.S. Pat. No. 3,208,866 discloses the addition of certain metal ion containing compounds to the reaction zone to provide control of the particle size of titanium dioxide pigment product. The use of these metal ion containing compounds also is disclosed as providing a pigment of improved processability, particularly with regard to the subsequent milling of the pigment. Such metal ion containing compounds include various salts (e.g., halides, nitrates, sulfates and the like) of metals of the Groups IA, IIA and the Lanthanide Series (e.g., cerium) of metals of the Periodic Table of Elements. According to this patent these metal ion containing compounds are introduced into the vapor phase oxidation reactor either in admixture with the oxidizing gas stream or directly to said oxidation reactor and into the mixed or mixing titanium halide and oxidizing gas just ahead of the actual flame of the reaction. In either event, the total quantity of the added metal containing compound is present in the mixed or mixing titanium halide and oxidizing gas reactants at the onset of the reaction between them.

As noted hereinabove, while the use of these metal ion containing compounds have been found to provide pigment products of more uniform particle size and higher bulk density, one disadvantage associated with such use is the difficulty encountered with the separation of the pigment product from the reaction gases in which the pigment product is suspended. However, it now has been found that when such metal ion containing compounds are introduced into the reaction mixture of titanium halide and oxidizing gas in separate and discrete increments, the aforementioned separation problem is overcome. Additionally, such problem is overcome while still obtaining the benefits provided by the metal ion containing compounds, namely control of particle size and quality of the titanium dioxide pigment quality.

In accordance with the improvement comprising the present invention, the metal ion containing compounds described herein for controlling pigment particle size and quality are introduced into the vapor phase oxidation reactor in at least two separate and discrete increments. The first of these increments is added to and present in the oxidation reactor at a point therein prior to the onset of reaction between the titanium halide and the oxidizing gas within the reaction zone of said reactor.

Generally, this first increment will comprise only that portion of the total amount of the metal ion containing compound required to provide control over the particle size and quality of the pigment being produced. Usually this portion will comprise only from about 5 to about 50 parts per million (based on the titanium dioxide pigment being produced) of the total amount of the metal ion containing compound which will be employed. In this regard, the total amount of the metal ion containing compound employed will range from about 100 to about 1000 parts per million and preferably from about 200 to about 500 parts per million based on the weight of the titanium dioxide pigment being produced.

The remaining balance of the metal ion containing compound may be added to the oxidation reactor either in a single increment or in two or more increments. When this remaining balance is added to the oxidation reactor as a single increment, such addition generally will be effected either at a point in the reactor where reaction between the titanium halide and the oxidizing gas has begun or at a point in the reactor wherein the reaction substantially is complete. When the remaining balance of the metal ion containing compound is added in two or more increments, generally one of said increments is added at a point in the oxidation reactor subsequent to the onset of but prior to substantial completion of reaction. The remaining increments generally will be added at a point in the oxidation reactor wherein the reaction substantially is complete. Whether added as a single increment or as two or more increments, it is critical that the remaining balance of the metal ion containing compound not be added to the reactor prior to the point therein where at least about 20 weight percent of the total titanium halide reactant has been converted to the desired titanium dioxide pigment product. Such point readily can be determined by those of ordinary skill in this art.

The metal ion containing compounds employed in the practice of the improvement of this invention include those compounds wherein the metal is one selected from the group consisting of Groups IA, IIA and the Lanthanide Series of metals of the Periodic Table of Elements. Representative of such metals are lithium, sodium, potassium, calcium, barium, cerium, and the like. Compounds containing these metals generally will be those that are readily ionizable at the high temperatures present in the oxidation reactor. Such compounds can include, for example, the halides, nitrates, sulfates, carbonates, phosphates, hydroxides, benzates, alcoholates, and the like, of the aforementioned metals. Of these compounds, the various halides (i.e., the chloride, bromide, iodide and fluoride) of the metal potassium (preferably potassium chloride) are the most useful. Various mixtures of the above illustrated metal containing compounds also can be advantageously employed. The metal ion containing compounds can be added to the oxidation reactor in any form. Thus, the compounds can be introduced either as a vapor, liquid or solid. Generally, the additive is advantageously effected by introducing the metal ion containing compound in solid form by pneumatically conveying the solid into the oxidation reactor using an inert gas such as nitrogen.

The improvement of this invention is particularly useful for preparing commercially acceptable titanium dioxide pigments having carbon black undertone (CBU) values consistently in the range of from about minus 6.0 to about minus 8.0. Pigments having CBU values in this range are particularly useful in the pigmentation of various polymeric materials for use in a wide variety of applications.

As is known in the art, carbon black undertone values are a measure of the particle size and particle size uniformity of any given pigment. They are determined by measuring the reflectance for red, blue and green light of samples containing standard amounts of carbon black and the titanium dioxide pigment in question with reference to a standard white surface such as, for example, magnesium oxide. The CBU value represents the difference between the reflectance for the blue and red light as a percentage of the reflectance for green light.

It also is known that the CBU value for a given pigment will depend upon the particular reference surface chosen, the wavelengths at which the reflectances are measured and the particular carbon black employed. Therefore, different choices of these various factors give rise to different scales of CBU values. It is known, however, that these different scales are in good agreement with each other for practical purposes. All of the CBU values referred to herein are measured on the same scale wherein the more negative the CBU value, the smaller the particle size of the pigment produced.

The following examples are presented to further illustrate the effectiveness of the improvement of this invention to provide a titanium dioxide pigment of controlled particle size, which is readily separated from the coproduced byproduct gases and which does not exhibit a tendency to cause blockage or pluggage of filtration equipment employed in conjunction therewith. Furthermore, an example of a titanium dioxide pigment generally prepared in accordance with the teachings of U.S. Pat. No. 3,208,866, is included for comparison purposes.

EXAMPLES 1-5

Employing a vapor phase oxidation reactor of the type disclosed in the aforementioned U.S. patent application Ser. No. 761,329, a series of vapor phase oxidation runs, using various amounts of potassium chloride to control particle size, were carried out. The oxidation reactor employed utilized a single oxygen reactant inlet assembly and downstream of said inlet a pair of titanium tetrachloride ($TiCl_4$) reactant inlet assemblies. The actual oxidation of the $TiCl_4$ reactant using this oxidation reactor took place in a pair of tubular reaction zones. The first of the tubular reaction zones was located between and connected to a pair of $TiCl_4$ inlet assemblies while the second of the tubular reaction zones was connected to the downstream side of the second $TiCl_4$ inlet assembly.

The oxygen and $TiCl_4$ reactants were combined in the above reactor in an approximately stoichiometric ratio plus an excess of the oxygen reactant of about 10 weight percent. In each of the runs conducted, the oxygen was preheated to a temperature of about 927° C.

prior to its introduction into the oxidation reactor through the oxygen inlet assembly.

The TiCl$_4$ reactant was added to the oxidation reactor in two stages. In the first stage, approximately 75 weight percent of the total TiCl$_4$ reactant used was preheated to a temperature of about 815° C. and introduced into the oxidation reactor through the first TiCl$_4$ inlet assembly. In the second stage the balance of the TiCl$_4$ reactant was preheated to a temperature in the range of from about 165° C. to about 185° C. and introduced into the oxidation reactor by way of the second TiCl$_4$ inlet assembly. Preheating of the oxygen and TiCl$_4$ reactants to the temperature disclosed above produces reaction temperatures in the range of about 1370° C. to about 1482° C. in the first reaction zone and reaction temperatures of from about 1260° C. to about 1315° C. in the second reaction zone.

As noted above and as set forth in the Table below, various amounts of particulate potassium chloride (KCl) were pneumatically conveyed to and introduced into the oxidation reactor. In each run, the KCl was introduced into the oxidation reactor in two separate and discrete increments. In each case the first increment was introduced into the oxidation reactor and mixed with the preheated oxygen reactant upstream of the first TiCl$_4$ inlet assembly and first reaction zone. The amount of this first KCl increment ranged from about 8 to about 44 parts per million, based upon the weight of the pigment being produced. The second increment or balance of the KCl was introduced into the first reaction zone of the reactor at a point in said zone immediately adjacent to the upstream side of the second TiCl$_4$ inlet assembly. At this point the oxidation of the portion of the TiCl$_4$ reactant introduced through the first TiCl$_4$ inlet assembly is substantially complete.

Following the oxidation of the balance of the TiCl$_4$ reactant in the second reaction zone, the hot gaseous stream issuing from the second reaction zone was quickly cooled by passing this stream through an externally cooled conduit affixed to the downstream or outlet end of this reaction zone. The TiO$_2$ pigment product suspended in this cooled gaseous stream was separated therefrom by conventional solids/gas separation equipment. The Table below contains data relating to this series of runs.

For comparison, two additional runs were carried out in a substantially similar manner with the exception that complete addition of the KCl additive was effected in a single increment. This single increment was introduced into the oxidation reactor and mixed with the oxygen reactant upstream of the first TiCl$_4$ inlet assembly and first reaction zone. In the Table below, these comparative examples are identified as Run Nos. A and B.

TABLE

| Run No. | KCl Added, ppm | | | CBU Value |
|---|---|---|---|---|
| | Increment #1 | Increment #2 | Total | |
| 1 | 8 | 293 | 301 | −3.4 |
| 2 | 12 | 293 | 305 | −4.9 |
| 3 | 16 | 293 | 309 | −5.4 |
| 4 | 30 | 293 | 323 | −6.7 |
| 5 | 44 | 293 | 337 | −8.0 |
| A | 101 | 0 | 101 | −12.4 |
| B | 146 | 0 | 146 | −6.1 |

The TiO$_2$ pigments produced in accordance with the present invention (i.e., Run Nos. 1-5) all exhibited rutile contents of ≧99.5 percent and all were readily separated from the gaseous stream in which they were suspended and without plugging of the filtration equipment associated with the solids/gas separation equipment employed. By contrast, the TiO$_2$ pigment produced in comparative examples A and B exhibited low rutile contents of 97.5 and 99.3 percent respectively, and upon separation in the solids/gas separation equipment tended to plug the filtration equipment employed therewith.

While the invention is described in respect to what at present are the preferred embodiments thereof, it will be understood that changes, substitutions, modifications and the like, can be made therein without departing from its true scope as defined in the appended claims.

We claim:

1. In a method for preparing a rutile titanium dioxide pigment by reaction of a mixture of a titanium halide and an oxidizing gas in a vapor phase in a reaction zone of a vapor phase oxidation reactor at a temperature of at least 800° C. in the presence of an added metal ion containing compound wherein the metal is selected from the group consisting of Groups IA, IIA and the Lanthanide Series of metals of the Periodic Table of the Elements, said metal ion containing compound being present in a total amount of from about 100 to about 1000 parts per million, based upon the weight of the titanium dioxide pigments being produced, the improvements which comprise:

introducing said metal ion containing compound into said reaction mixture of titanium halide and oxidizing gas in said reaction zone in separate and discrete increments comprising a first increment and at least one additional increment, wherein said first increment is introduced into said reaction at a point therein prior to onset of reaction between said titanium halide and said oxidizing gas within said reaction zone and wherein said at least one additional increment is introduced into said reaction zone at a point therein subsequent to the reaction of at least about 20 weight percent of said titanium halide with said oxidizing gas; and recovering the titanium dioxide pigment substantially as produced.

2. The improvement of claim 1 wherein said first increment of said metal ion containing compound comprises from about 5 to about 50 parts per million, based on the weight of the titanium dioxide pigment being produced, of the total amount of said metal ion containing compound added.

3. The improvement of claim 1 wherein said at least one additional increment of said metal ion containing compound comprises a balance of the total amount of said metal ion containing compound added.

4. The improvement of claim 1 wherein said titanium halide is titanium tetrachloride.

5. The improvement of claim 1 wherein the reaction of the mixture of said titanium halide and said oxidizing gas is carried out at a temperature ranging from about 1200° C. to about 1500° C.

6. The improvement of claim 1 wherein the metal in the metal ion containing compound is a metal selected from the Group IA elements of the Periodic Table of Elements.

7. The improvement of claim 6 wherein the metal is potassium.

* * * * *